UNITED STATES PATENT OFFICE 2,628,893

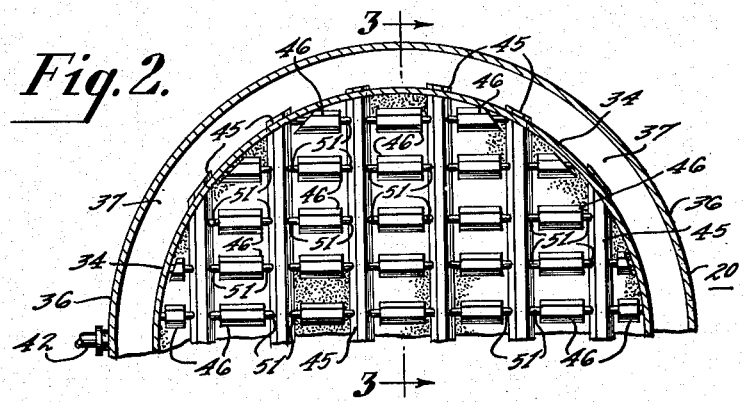
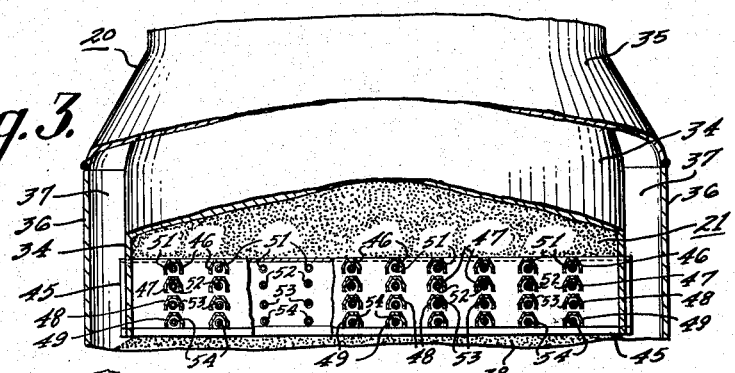
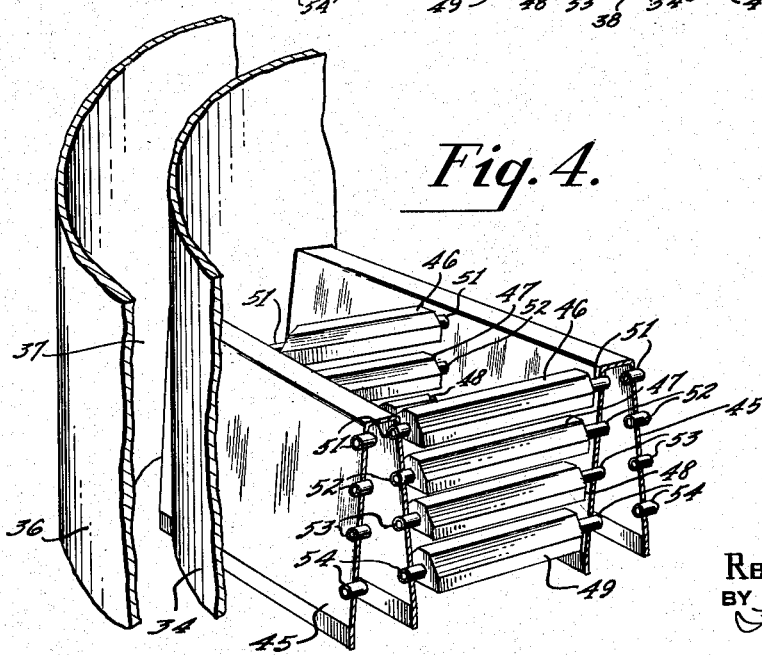

DISENGAGEMENT OF GASES FROM A MOVING BED OF FLUENT SOLID PARTICLES

Reyner Kollgaard, Media, Pa., assignor to Houdry Process Corporation, Wilmington, Del., a corporation of Delaware Application May 24, 1950, Serial No. 163,870

6 Claims. (Cl. 23—288)

The use of moving bodies of fluent solid particles in processes that involve the contact of masses of such solid particles with fluids, as, for example, catalytic conversions of organic vapors by solid catalysts, has resulted in considerable advantages due to the continuous nature of the process but has also created problems arising from the inherent characteristics of such processes and of solid particles in such a fluent state. One such problem involving the disengagement of gas flowing concurrently through a downwardly moving compact non-turbulent bed of solid particles in a contact zone may be overcome using apparatus embodying the present invention.

The disengagement of downwardly flowing gas from such beds of solid particles involves the formation of free surfaces of particles (usually called disengaging surfaces) and a reversal of flow of the gas so as to pass upwardly through the free surfaces so formed. Under such conditions, excessive amounts of particles are entrained in the disengaged gas unless the velocity of the gas at the point of disengagement is below the lifting velocity of the particles.

Recent investigations have shown that it is often desirable in such processes to flow the gas downwardly through the moving contact mass at high gaseous velocities. These gaseous velocities may have a magnitude such that, if the gaseous flow were upward, the downward flow of solid particles would be disturbed to such an extent as to result in stoppage of the flow of solid particles and/or disruption of the bed with resulting turbulence, channelling of the gas and similar effects. These effects have been capably discussed in a recent patent (U.S. Patent No. 2,439,348, issued April 6, 1948, to T. P. Simpson, R. E. Lee and F. E. Ray). The cited patent points out the advantages of multistage disengagement under conditions such that the disengaging surfaces provide a substantially greater area than the horizontal cross sectional area of the bed of solid particles in the contact zone and hence permit disengagement of the gas without entraining solid particles. The present invention is particularly advantageous when the conditions encountered are such that the gaseous velocities are of the magnitude referred to above and in the cited patent and, like the invention in the cited patent, is useful in connection with a wide variety of processes.

However, the present invention will, for convenience and brevity, be described in terms of use with a hyrocarbon conversion process, particularly cracking; those skilled in the art will be able to apply the process and apparatus set forth herein to other fields and uses.

The problem of high gaseous velocities becomes particularly important when hyrocarbon cracking systems are operated advantageously at high catalyst to oil ratios, such as four or more, such as from about 5 to 20. It then becomes desirable and highly advantageous to employ concomitantly higher space velocities than have previously been customary in commercial moving bed systems for equal conversion. As is commonly understood, when the space velocity is high, the volume of catalyst present in the conversion zone is small. When space velocities above one, such as about 2 to 10, are used, this effect must be considered in the design of convertor or reactor vessels.

As shown in the cited patent, disengaging surfaces may be developed by a plurality of sets of multiple inverted troughs, these sets being placed at a plurality of vertical levels (multilevel disengagement). At high vapor flow rates, convertors of relatively small or medium size horizontal cross sectional area need so many sets of inverted troughs that disengagement starts at such a high level in the bed in the conversion zone that the total hydrocarbon vapors traverse only a small fraction of bed therein before some of the vapors are disengaged from the particles of catalyst and cease to be converted. However, it is obviously desirable from the standpoint of uniformity of conversion conditions to have as much of the vapors as possible contact all of the bed of particles.

A further complication is introduced by the necessity of supporting these troughs and the associated manifolds or totally enclosed hollow beams presently used in commercial vessels against the forces exerted by the downwardly moving solid particles and downwardly flowing gas. In vessels of commercial size, these forces are great enough that a supporting beam or beams must be used, being generally placed so as to carry the load of several sets of channels and associated manifolds thereabove. These beams are expensive, complicate the internal structure of the vessel and add height to the vessel; all of which are obviously undesirable effects.

These and other difficulties are overcome by using methods disclosed in my copending application, filed of even date herewith jointly with Reuben T. Savage. The manner of operation described in said application is particularly advantageous when used in connection with systems as described herein, and comprises flowing gas downwardly through a downwardly moving non-turbulent bed of solid particles in a contact zone, disengaging gas so flowing from the particles at a plurality of locations in the bottom of the contact or conversion zone, the gas so disengaged being directed along a plurality of spaced horizontal paths located at the bottom of the contact zone, which paths are free of solid particles but in gaseous communication with said bed. The gas is then discharged from said paths into a peripheral gas manifolding zone contiguously located above a free surface of particles peripherally located outside the bottom of the contact zone and formed by flowing particles divergently outwardly from the bottom of said contact zone into a zone of greater horizontal extent than the contact zone and located concentrically therebelow, gas being thereafter removed from the gas manifolding zone. The apparatus for effecting the described method of disengagement is, as described below, advantageously contrived and constructed so as to be self-supporting.

The present invention is directed to apparatus contrived and adapted to operate in the manner above described, such apparatus being easily and relatively inexpensively constructed. The apparatus comprises an upper vertical shell closed at the top and open at the bottom, which shell defines a contacting chamber adapted to contain a downwardly moving non-turbulent bed of particles and a lower vertical shell in spaced overlapping relation to and encompassing the lowermost portion of said upper shell with the top of said lower shell joined to the outermost periphery of said upper shell so that the lowermost portion define a peripheral gas manifolding chamber. Associated with the contacting chamber are means for introducing particles and for introducing gas to the top of said bed while means to remove particles from the lower shell are provided in conjunction with the lower shell.

In accordance with the present invention, there is positioned within the lowermost region of the contacting chamber gas disengaging means comprising a plurality of open-bottomed parallel vertically elongated gas passageways extending horizontally across said contacting chamber to and through the upper shell in communication with said peripheral gas manifolding chamber and a multiplicity of gas disengaging members positioned between said passageways at different levels along the vertical height thereof, said disengaging members being in gaseous communication with said passageways.

The principles involved in the present invention are set forth in detail below in connection with the description of the drawings in which:

Figure 2 is a transverse section of the vessel illustrated in Figure 1 taken along the lines 2—2 showing the relationship of the parts of the apparatus at these levels.

Figure 3 is a vertical view of the disengaging elements shown in Figure 1 at a position 90° to the view in Figure 1.

Figure 4 is an enlarged isometric view of several of the disengaging elements shown in Figures 1, 2 and 3.

Figure 1:
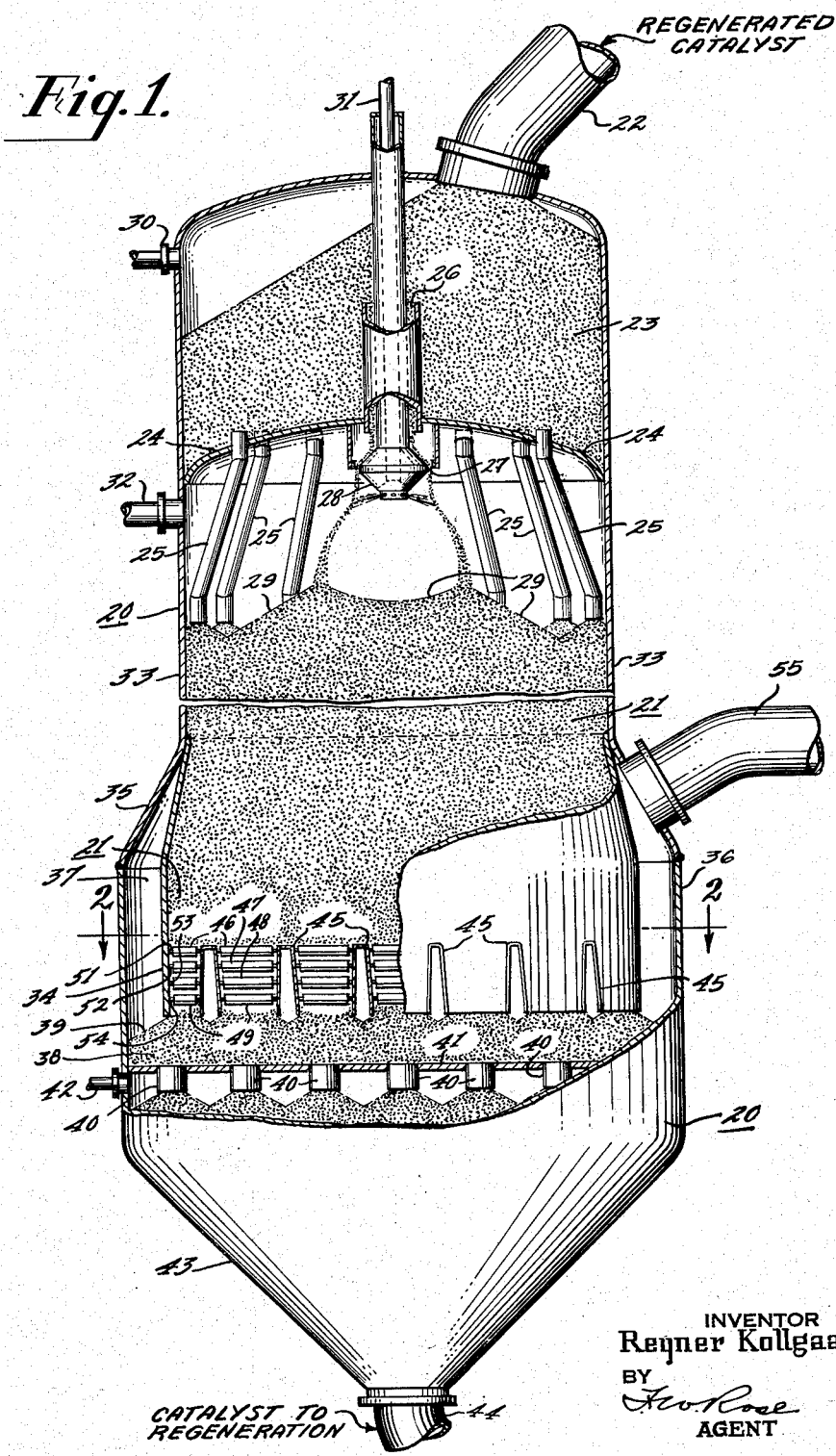
Figure 1 is a vertical view of a vessel containing a moving bed of solid particles contacted by gases, with portions of the vessel broken away for a better view of the relationship of the parts, and illustrates a preferred embodiment of the invention.

Shown in Figure 1 is a closed housing or vessel indicated generally at 20, which housing comprises a contacting or cracking chamber or zone containing a downwardly moving bed of solid particles of catalyst as indicated generally at 21. Fluent solid particles in the size range of from about 50 mesh to about 0.5 inch and comprising freshly regenerated solid hydrocarbon conversion catalyst, such as acid activated montmorillonite clay, synthetic silica-alumina gel in pellet or bead form or other solid refractory compositions known by those skilled in the art to be hydrocarbon cracking catalysts, are introduced to housing 20 by conduit 22 at the top thereof and form a bed 23 in a catalyst introduction, storage or sealing chamber in the top of the housing above baffle or tube sheet 24 as shown. Particles in bed 23 flow from the storage chamber to the cracking or contacting chamber through conduits 25 (which are arranged equidistantly from the center of housing 20) and through annular passageways 26 and 27. The latter particles fall as a curtain past nozzle 28 to the surface of bed 21, the profile of which surface is approximately indicated by dotted lines 29. All of the particles so introduced thereafter gravitate downward as a compact non-turbulent bed. A sealing gas, such as steam, inert flue gas and the like, is introduced to the storage or sealing chamber above bed 23 through conduit 30 at a pressure above the pressure in the cracking zone. Part of the sealing gas passes upwardly through the particles flowing downwardly in conduit 22. Another part of the sealing gas passes downwardly through conduits 25, thus serving as a means to confine the hydrocarbons within the cracking zone.

A liquid hydrocarbon charge stock is introduced to the cracking zone by conduit 31 and nozzle 28 for atomization and contact with the falling particles in the curtain, which particles are at a substantially higher temperature than the liquid hydrocarbon charge stock. If desired, hydrocarbons in vapor form may be introduced by conduit 32. Hydrocarbon vapors either introduced by conduit 32 or formed by contact of liquid hydrocarbon charge stock with particles of catalyst in the curtain of falling particles pass downwardly through bed 21, flowing downwardly concurrently with the particles of catalyst. As is well understood by the art, conditions are maintained in the cracking zone so that these hydrocarbon vapors are cracked.

The cracking chamber or zone is defined laterally by a portion of the wall or shell of housing 20 which is shown in Figures 1 and 2 as a cylindrical wall 33 and which serves to confine the bed of particles moving downwardly. The lower portion of the cracking chamber or zone is expanded (i. e., has a horizontal cross sectional area greater than that of the upper portion), thereby affording space for the disengaging members described below without undesirably restricting the area available for the flow of solid particles. Such an expanded lower portion may be formed, as shown in Figure 1, by affixing to wall 33, as by welding, a skirt 34 comprising an upper swaged portion of frusto-conical shape and a lower cylindrical portion. The angle between the frusto-conical portion and a horizontal plane at the base thereof should be greater than the angle of repose of the solid particles and preferably great enough to insure uniform flow of the bed of particles thereabove, such as an angle of 70° or greater. The outer wall of housing 20 comprises a swaged frusto-conical portion 35 below cylindrical portion 33. Frusto-conical portion 35 of the housing is substantially vertically coextensive with the frusto-conical portion of skirt 34 and spaced outwardly therefrom. Below frusto-conical portion 35, the wall of the housing 20 comprises a cylindrical portion 36 which is spaced outwardly from the bottom portion of skirt 34.

The described arrangement provides an upper vertical shell consisting of wall 33 and skirt 34 and a lower vertical shell comprising swaged portion 35 and cylindrical portion 36, the lower vertical shell being in spaced overlapping relation to and encompassing the lowermost portion of the upper shell. The lower vertical shell thus constitutes means defining a chamber into which extends a vertical conduit (i. e., the upper vertical shell) of smaller horizontal extent than said chamber. Because of the spaced overlapping relation of the upper and lower vertical shells, they define and bound, upwardly and laterally, a chamber 37 which, as described below, serves as a peripheral gas manifolding or collecting zone or chamber.

Particles of catalyst discharging from the cracking zone or chamber, which substantially terminates at the bottom of skirts 34, flow downwardly to form a bed 38 and simultaneously flow divergently outwardly, since the portion of the housing at this level (wall 36) defines a zone or chamber of greater horizontal extent or cross sectional area than that of the cracking zone. As a result of such flow, the particles form a free surface, which is annular in shape and peripherally located with respect to bed 38 and skirt 34 (i. e., the bottom of the cracking zone or chamber), as indicated in Figure 1 by dotted line 39. The particles in bed 38 move downwardly and discharge from the bed through particle discharge conduits 40 in baffle or tube sheet 41.

It is desirable to purge the particles of catalyst at this point in the system, which can be conveniently effected by introducing steam or other purge gas through conduit 42 for upward flow through conduits 40. After purging, the particles of catalyst flow downwardly through the downwardly and inwardly tapering bottom portion 43 of housing 20 to conduit 44, and thence to regeneration equipment of a type known to the art. Smooth flow and even withdrawal of the particles through bottom portion 43 can be achieved by devices known to the art, such as that described in U. S. Patent 2,412,136 issued on December 3, 1946, to L. P. Evans et al. After regeneration, the particles of catalyst are returned to conduit 22 at the top of housing 20 by method and apparatus known to the art.

A plurality of channels or passageways 45 in parallel spaced relation are positioned in the bottom region of the cracking zone or chamber, these channels being shaped, for example, as shown in Figures 1 and 4, in the form of an inverted V, so as to have a vertically elongated cross sectional shape. As shown in Figures 2 and 3, channels 45 extend laterally across the cracking zone or chamber to and through skirt 34 to which the channels are affixed as by welding. Channels 45 are open at the bottom so that the bed of particles flows beneath the channels so as to form disengaging surfaces. Channels 45, which are open at the ends, communicate with chamber 37 and thus provide a plurality of spaced parallel horizontal paths free of solid particles but in gaseous communication with the bed of particles and in communication with a peripheral gas manifolding zone.

In accordance with the present invention, a multiplicity of spaced baffles adapted and shaped to divert the flow of solid particles and to form gas disengaging surfaces of said particles with gas collection spaces free of solid particles above said surfaces, and hence act as transverse gas disengaging members, are positioned between and normal to channels 45 and communicate therewith, these baffles being shown in the drawings in the form of inverted shallow troughs 46, 47, 48 and 49. As shown in Figures 1, 2 and 4, inverted troughs 46, 47, 48 and 49 communicate at their ends (which are otherwise closed) with at least one of adjacent channels 45 through pipes or conduits 51, 52, 53 and 54 as described more fully below. Inverted troughs 46, 47, 48 and 49 are spaced at four vertical levels between the bottom and top of channels 45 (i. e., there are four sets of a plurality of inverted troughs, each set positioned in a common horizontal plane).

Gas disengaged from the bed at the disengaging surfaces formed under troughs 46, 47, 48 or 49 flows laterally to the nearer end of the trough involved, through one of conduits 51, 52, 53 or 54 and into channel 45. Conduits 51, 52, 53 and 54 are sized or contain orifices so that they act as metering conduits for the flow of gas. By appropriate sizing of the conduits or orifices, the pressure drop therethrough is such that each trough in any vertical series has a selected volume of gas passing therethrough. A further portion of the gas flows downwardly with the catalyst particles between channels 45 and disengages at the disengaging surfaces of the particles formed below the open bottoms of channels 45. The entire or total disengaged gas flows laterally along channels 45 and discharges into the space 37 between skirt 34 and wall 36, space 37 serving as a peripheral gas manifolding chamber or gas collection zone. Because the peripheral gas collection zone 37 is located contiguously above the free peripheral surface 39 of particles below the cracking zone, any particles entrained in the disengaged gas will settle out in chamber 37, which is preferably sized so that the gas velocity is lower than that in channels 45, and drop to surface 39, thus rejoining the particles in the bed and being removed therewith. Gas in chamber 37 is removed therefrom through conduit 55 for appropriate further processing.

In one embodiment of the invention, the gas disengaged by inverted troughs 46, 47, 48 and 49 is fed into channels so as to provide equal velocities of flow of gas in each of channels 45 by controlling the amount and/or direction of flow of gas through metering conduits 51, 52, 53 and 54. As is seen by inspection of Figure 2, the horizontal area of the bed associated with the outermost channels 45 (at the extreme right and extreme left of Figure 2) is considerably less than that of the intermediate channels 45 (nearer the center) with the center channels serving the largest area. As a result, the amount of gas flowing in the various channels 45 will vary. If the channels have the same vertical cross sectional area (for gas flow) and are spaced equidistantly from each other as is desirable for ease and economy in construction, the outermost channels will be underloaded when the center channels are operated at the maximum safe capacity. Should the outermost channels be operated at capacity, the intermediate and center channels will be overloaded (i. e., operating at a gaseous velocity that will entrain solid particles and seriously disturb the disengaging surfaces under these channels). Such a condition is prevented by flowing through the outermost channels a greater proportion of gas by proper sized orifices in conduits 51, 52, 53 and 54. Alternatively, one conduit of each pair associated with the various troughs may be blocked so that the gas from this trough flows into a single channel, the overall effect of such blocking being that the total gas flow in each channel is substantially equal to that in every other channel (i. e., the amount of gas flowing per square inch of vertical cross sectional area is approximately the same for all channels 45).

This can be effected, for example, by flowing all of the gas in the outermost inverted troughs into the outermost channels together with gas from 2 out of 3 of the inverted troughs in the next row; flowing the gas from 2 out of 3 of the troughs in the succeeding row into the intermediate channels, together with gas from 1 out of 3 of the preceding row; and feeding the center channels by alternate inverted troughs in the center row together with 1 out of 3 of troughs in the rows on either side of the center row. Under these conditions, the gas flow in the various channels tends to be equalized.

In accordance with a preferred embodiment of the invention, channels 45 shown in Figures 1, 3 and 4 have a shape such that their vertical cross section has relatively high walls which slope slightly outwardly to a narrow base. Such a shape has the dual advantage of providing sufficient cross sectional area for the flow of gas across the exposed surface of the bed of particles immediately below the channel without serious disturbance of such surfaces while also providing a very efficient support member for the weight of the channel as well as the weight of the inverted troughs supported by the channel. This efficiency results because substantially all of the metal in the channel is in the vertical side wall thus providing a deep or tall vertical member which is several times, such as from 3 to 10 times, as deep as the channel is wide. As can be clearly seen in Figure 3, inverted troughs 46, 47, 48 and 49 are unsupported except by conduits 51, 52, 53 and 54 which transmit the load on these members to channels 45. (The load comprises the weight of these members, together with the forces exerted by the downwardly moving particles and gas.) By making the walls of channels 45 thick, the channels support not only the load imposed on them individually but also the load (on the members thereabove) transmitted to them through conduits 51, 52, 53 and 54. Since channels 45 are joined to the rest of the structure only at skirt 34, and hence are supported solely by the walls of the contacting chamber, the expense of a supporting beam and the space occupied by such a beam is advantageously saved.

An additional advantage of the invention above described arises from the fact that the structure is extremely rigid and fixed in position, the latter being a very desirable feature in view of the difficulties that would be occasioned by movement of two channels toward each other with a consequent restriction or stoppage of the flow of particles therethrough and a resulting reflection of this disturbance of flow upwardly through the bed.

Those skilled in the art will understand from the above description how to apply the methods and apparatus of the present invention to a variety of problems. Thus, additional levels of inverted troughs 46, 47, 48 and 49 can be employed instead of the four levels shown when a larger disengaging capacity is desired or fewer levels, such as two or three, may be used for lesser disengaging capacity is adequate. Alternatively, the inverted troughs may be in staggered relation (i. e., a trough is placed at a level intermediate the levels of adjacent vertical series of troughs).

In another modification of the invention the transverse troughs or channels may be of the same vertical height as channels 45, with the bottoms of the transverse channels positioned in the same horizontal plane as the one in which the bottoms of channels 45 are located. Such an arrangement is advantageous in that all disengaging surfaces are at the same level with a resulting simplification in the design, construction and operation of the disengaging section as a whole. Another advantage of the described arrangement is that it provides a very rigid structure, since the transverse channels act as cross braces. The disengaging section can be constructed as a unit and thereafter placed in the reactor on supports affixed to the walls of the reactor. Further modifications of the basic structure will be suggested to those skilled in the art by the description herein.

Obviously many modifications and variations of the invention as hereinbefore set forth may be made without departing from the spirit and scope thereof and therefore only such limitations should be imposed as are indicated in the appended claims.

I claim as my invention:

1. Apparatus for contacting gaseous material with fluent solid particles which comprises a contact chamber having an open lower end, means for introducing said solid particles into the upper region of said contact chamber, means for introducing said gaseous material into the upper region of said chamber, means below said open lower end and fixed with respect to said contact chamber for supporting said solid particles as a gravitating compact mass extending upwardly into said contact chamber and terminating in the upper region thereof, and means at the lower end of said contact chamber for disengaging said gaseous material from said solid particles and removing said gaseous material from said apparatus, said last-mentioned means comprising a peripheral manifold chamber surrounding the lower end portion of said contact chamber, a plurality of parallel, inverted, relatively deep channel members extending horizontally across said open lower end to and through the opposite walls of said contact chamber, the ends of said deep channel members being in open communication with said peripheral manifold chamber, a plurality of inverted relatively shallow trough members horizontally and transversely spanning the spaces on either side of said deep channel members, said trough members being closed at their ends and arranged substantially wholly within the vertical limits of each space as a plurality of parallel tiers, and means at either end of said trough members for supporting the same from opposite wall surfaces laterally defining said spaces, at least one of the support means for each shallow channel member having a confined passageway providing open communication with one of said deep channel members.

2. Apparatus as defined in claim 1 in which the number of trough support means which provide open communication with each of said deep channel members is such as to provide a substantially equal flow of gaseous material through said deep channel members.

3. Apparatus as defined in claim 1 in which the flow path of said deep channel members has a ratio of depth to average width in the order of about 3:10.

4. Apparatus as defined in claim 1 in which said confined passageways in said trough support means include orifices, said orifices being sized to provide a substantially equal flow of gaseous material per square inch of vertical cross-sectional area for all said deep channel members.

5. Apparatus as set forth in claim 1 in which said peripheral manifold chamber comprises a shell beneath said contact chamber having its upper end portion surrounding the lower end portion of said contact chamber in spaced overlapping relation thereto, the upper end of said shell being extended inwardly and joined to the outer wall of said contact chamber, and said means for supporting said particles comprises a horizontal tube sheet extending across said shell at a distance below the lower end of said contact chamber, the portion of said gravitating compact mass below said contact chamber forming an expanded bed having an annular exposed surface between the lower perimeter of said contact chamber and the inner wall of said shell which forms the lowermost boundary of said peripheral manifold chamber.

6. Apparatus as defined in claim 5 in which the configuration of said manifold chamber is such that the velocity of said gaseous material proximate to the exposed surface of solid particles forming the lowermost boundary of said manifold chamber is less than the supporting velocity of said solid particles.

REYNER KOLLGAARD.

REFERENCES CITED

The following references are of record in the file of this patent:

UNITED STATES PATENTS

| Number | Name | Date |
|---|---|---|
| 2,400,194 | Day et al. | May 14, 1946 |
| 2,458,165 | Holn | Jan. 4, 1949 |
| 2,492,999 | Lassiat | Jan. 3, 1950 |

OTHER REFERENCES

Houdry Pioneer, vol. 1, No. 4, June 1946, page 4.